United States Patent
Pettersson et al.

(10) Patent No.: US 10,257,417 B2
(45) Date of Patent: Apr. 9, 2019

(54) METHOD AND APPARATUS FOR GENERATING PANORAMIC IMAGES

(71) Applicant: Microsoft Technology Licensing, LLC, Redmond, WA (US)

(72) Inventors: Gustaf Pettersson, Ljungbyed (SE); Karim Benchemsi, Lund (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 15/163,626

(22) Filed: May 24, 2016

(65) Prior Publication Data

US 2017/0347022 A1    Nov. 30, 2017

(51) Int. Cl.
| | |
|---|---|
| *H04N 5/232* | (2006.01) |
| *G06T 7/00* | (2017.01) |
| *G09G 5/377* | (2006.01) |
| *H04N 5/265* | (2006.01) |
| *H04N 5/262* | (2006.01) |

(52) U.S. Cl.
CPC ....... *H04N 5/23238* (2013.01); *G06T 7/0002* (2013.01); *G09G 5/377* (2013.01); *H04N 5/265* (2013.01); *H04N 5/2624* (2013.01); *G06T 2207/10016* (2013.01); *G06T 2207/20221* (2013.01); *G09G 2360/12* (2013.01)

(58) Field of Classification Search
None
See application file for complete search history.

(56) References Cited

U.S. PATENT DOCUMENTS

| | | |
|---|---|---|
| 5,987,164 A | 11/1999 | Szeliski et al. |
| 7,460,730 B2 | 12/2008 | Pal et al. |
| 7,746,375 B2 | 6/2010 | Ketelaars et al. |
| 7,746,404 B2 | 6/2010 | Deng et al. |
| 8,068,693 B2 | 11/2011 | Sorek et al. |
| 8,947,502 B2 | 2/2015 | Mashiah |

(Continued)

OTHER PUBLICATIONS

Sun, et al., "A Novel Algorithm to Stitch Multiple Views in Image Mosaics", In Proceedings of IEEE International Conference on Acoustics, Speech, and Signal Processing, vol. 3, May 17, 2004, 4 pages.

(Continued)

*Primary Examiner* — Eileen M Adams

(57) ABSTRACT

A method and an apparatus for generating panoramic images are presented. The method includes receiving a set of consecutive image frames. A portion of a first image frame is extracted to configure an intermediate panoramic image. The intermediate panoramic image is augmented by stitching image frame portions to the intermediate panoramic image. The image frame portions are selected from individual image frames in a subset of image frames including consecutive image frames from a second image frame to a penultimate image frame. Each image frame portion is selected based on a sharpness measure and an overlap measure associated with the respective individual image frame. The overlap measure is determined based on a comparison of the respective individual image frame with a current state of the intermediate panoramic image. A portion of a last image frame is stitched to the augmented intermediate panoramic image to configure the panoramic image.

20 Claims, 9 Drawing Sheets

(56) References Cited

U.S. PATENT DOCUMENTS

| | | |
|---|---|---|
| 9,088,714 B2 | 7/2015 | Doepke et al. |
| 2003/0095193 A1 | 5/2003 | May et al. |
| 2006/0256397 A1 | 11/2006 | Cui |
| 2007/0081081 A1 | 4/2007 | Cheng |
| 2009/0021576 A1 | 1/2009 | Linder et al. |
| 2010/0194851 A1 | 8/2010 | Pasupaleti et al. |
| 2011/0141229 A1 | 6/2011 | Stec et al. |
| 2013/0329132 A1 | 12/2013 | Tico et al. |
| 2015/0221116 A1 | 8/2015 | Wu et al. |
| 2016/0063705 A1* | 3/2016 | Xu .................... G06T 5/50 382/199 |
| 2016/0301864 A1* | 10/2016 | Petrany .............. H04N 5/23238 |

OTHER PUBLICATIONS

Koo, et al., "Composition of a Dewarped and Enhanced Document Image From Two View Images", In IEEE Transactions on Image Processing, vol. 18, Issue 7, Jul. 1, 2009, pp. 1551-1562.

"International Search Report and Written Opinion Issued in PCT Application No. PCT/US2017/033202", dated Aug. 23, 2017, 14 Pages.

* cited by examiner

METHOD AND APPARATUS FOR GENERATING PANORAMIC IMAGES

TECHNICAL FIELD

The present application generally relates to image capture and display mechanisms, and more particularly to a method and apparatus for generating panoramic images from captured sequences of image frames.

BACKGROUND

Generally, for capturing a panoramic image, a user sweeps or pans an image capture device, such as a camera, while the image frames are being captured. Such a movement of the camera during image frame capture may introduce undesirable artefacts, such as blur, in the captured image frames.

Further, in many image capture devices, such as mobile phones for instance, the lens is mounted on springs. The spring-mounted lens may experience involuntary oscillation during movement of the image capture device and this may also introduce blur in the captured image frames.

In some scenarios, a shake of a hand holding the camera during image frame capture may also add to the blur in the captured image frames. Moreover, if a frequency of the handshake coincides with a resonance frequency of the lens and spring assembly, then at least a part of the captured image may be out of focus on account of the rolling shutter.

If image frames affected by blur are used for generating a panoramic image, then parts of the panoramic image may appear blurry.

The embodiments described below are not limited to implementations, which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, a method for generating a panoramic image from a set of consecutive image frames is presented. The method includes receiving the set of consecutive image frames. A portion of a first image frame from among the set of consecutive image frames is extracted to configure an intermediate panoramic image. The method includes augmenting the intermediate panoramic image by stitching image frame portions to the intermediate panoramic image. Each image frame portion is selected from a respective individual image frame in a subset of image frames comprising consecutive image frames from a second image frame to a penultimate image frame from among the set of consecutive image frames. Each image frame portion is selected based on a sharpness measure and an overlap measure associated with the respective individual image frame. The overlap measure is determined based on a comparison of the respective individual image frame with a current state of the intermediate panoramic image. The method further includes stitching a portion of a last image frame from among the set of consecutive image frames to the augmented intermediate panoramic image to configure the panoramic image.

In an embodiment, an apparatus for generating a panoramic image from a set of consecutive image frames is presented. The apparatus includes at least one processor and at least one memory. The at least one memory includes a buffer and computer program code. The at least one memory and the computer program code are configured to, with the at least one processor, cause the apparatus to receive the set of consecutive image frames. A portion of a first image frame from among the set of consecutive image frames is extracted to configure an intermediate panoramic image. The apparatus is caused to augment the intermediate panoramic image by stitching image frame portions to the intermediate panoramic image. Each image frame portion is selected from a respective individual image frame in a subset of image frames comprising consecutive image frames from a second image frame to a penultimate image frame from among the set of consecutive image frames. Each image frame portion is selected based on a sharpness measure and an overlap measure associated with the respective individual image frame. The overlap measure is determined based on a comparison of the respective individual image frame with a current state of the intermediate panoramic image. The apparatus is further caused to stitch a portion of a last image frame from among the set of consecutive image frames to the augmented intermediate panoramic image to configure the panoramic image.

In an embodiment, an apparatus for generating a panoramic image from a set of consecutive image frames is presented. The apparatus includes at least one processor and at least one memory. The at least one memory includes a buffer and computer program code. The at least one memory and the computer program code are configured to, with the at least one processor, cause the apparatus to receive the set of consecutive image frames. A portion of a first image frame from among the set of consecutive image frames is extracted to configure an intermediate panoramic image. The apparatus is caused to augment the intermediate panoramic image by stitching image frame portions to the intermediate panoramic image. Each image frame portion is selected from a respective individual image frame in a subset of image frames comprising consecutive image frames from a second image frame to a penultimate image frame from among the set of consecutive image frames. The image frame portions are selected by sequentially performing for the consecutive image frames in the subset of image frames: (1) determining an extent of disparity between an image frame in the subset of image frames and a current state of the intermediate panoramic image; (2) storing at least a part of the image frame as an image frame portion in the buffer if the extent of disparity satisfies a predefined disparity criterion, where one or more image frame portions from image frames satisfying the predefined disparity criterion are stored in the buffer until a subsequent image frame not satisfying the predefined disparity criterion is encountered; (3) identifying one image frame portion associated with a highest sharpness measure from among the one or more image frame portions stored in the buffer based on sharpness measures associated with respective image frames corresponding to the one or more image frame portions; and (4) stitching the one image frame portion to the intermediate panoramic image, where the current state of the intermediate panoramic image is updated upon stitching of the one image frame portion to the intermediate panoramic image; and (5) repeating the operations of determining, storing, identifying and stitching for remaining image frames from among the subset of image frames. The apparatus is further caused to stitch a portion of a last image frame from among the set of consecutive image frames to the augmented intermediate panoramic image to configure the panoramic image.

Many of the attendant features will be more readily appreciated, as the same becomes better understood by reference to the following detailed description considered in connection with the accompanying drawings.

DESCRIPTION OF THE DRAWINGS

The present description will be better understood from the following detailed description read in light of the following accompanying drawings, wherein.

Like reference numerals are used to designate like parts in the accompanying drawings.

DETAILED DESCRIPTION

The various embodiments disclosed herein suggest generating panoramic images by stitching sharp image frame portions selected from captured consecutive image frames. Selecting sharp image frame portions for generating panoramic images, as opposed to selecting image frame portions with an appropriate amount of overlap, avoids selecting image frame portions with blur, thereby improving a quality of generated panoramic images. A viewer of such generated panoramic images may be able to view the panoramic images without blur, thereby providing the viewer with a pleasant and comfortable viewing experience.

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
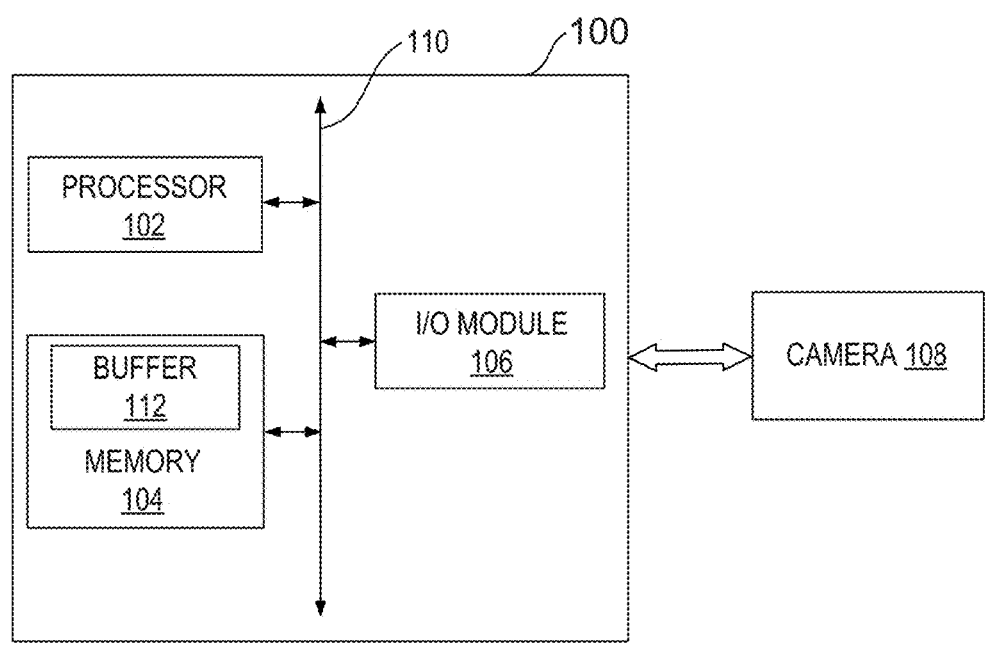
FIG. 1 is a block diagram showing an apparatus, in accordance with an example embodiment.

FIG. 1 is a block diagram showing an apparatus 100, in accordance with an example embodiment. In at least one example embodiment, the apparatus 100 includes a processor for example, a processor 102, and at least one memory for example, a memory 104. The memory 104 is capable of storing machine executable instructions. Further, the processor 102 is capable of executing the stored machine executable instructions. The processor 102 may be embodied in a number of different ways. In an embodiment, the processor 102 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In at least one example embodiment, the processor 102 utilizes computer program code to cause the apparatus 100 to perform one or more actions.

The memory 104 may be embodied as one or more volatile memory devices, one or more non-volatile memory devices or a combination of one or more volatile memory devices and non-volatile memory devices. For example, the memory 104 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.). The memory 104 further includes a buffer 112 configured to store parts of image frames, or in some cases whole image frames, as will be explained in further detail later.

The apparatus 100 further includes an input/output (I/O) module 106 configured to enable the apparatus 100 to receive input and provide output. For example, the I/O module 106 may receive an input of a set of consecutive image frames captured by a camera and generate an output configured to cause a display of a panoramic image on a display screen of an electronic device. To that effect, the I/O module 106 may be in operative communication with at least one camera, such as a camera 108. The camera 108 may include hardware and/or software necessary for capturing one or more image frames. For example, the camera 108 may include hardware, such as a lens assembly including one or more lens, and, an image sensor. Examples of the image sensor may include, but are not limited to, a complementary metal-oxide semiconductor (CMOS) image sensor, a charge-coupled device (CCD) image sensor, a backside illumination sensor (BSI) and the like. In some embodiments, the camera 108 may include only the hardware for capturing image frames, while the memory 104 of the apparatus 100 stores instructions for execution by the processor 102 in the form of software for generating an output such as a panoramic image from a set of consecutive image frames. In an example embodiment, the camera 108 may further include a processing element such as a co-processor that assists the processor 102 in processing image frame data and an encoder and/or decoder for compressing and/or decompressing image frame data. The encoder and/or decoder may encode and/or decode according to a standard format, for example, a Joint Photographic Experts Group (JPEG) standard format.

In FIG. 1, the camera 108 is depicted to be in operative communication with the apparatus 100, however in some embodiments, the camera 108 may be included within the apparatus 100. In some example embodiments, the camera 108 may be included within an electronic device housing the apparatus 100. Examples of the electronic device may include, but are not limited to, a camera device, a mobile phone, a laptop computer, a tablet computer, a media player, a video recorder, a video conferencing system, a wearable device equipped with image/video capture capabilities, and the like. Alternatively, in some embodiments, the camera 108 may be disposed external to the electronic device and may be operatively coupled to the apparatus 100 housed within the electronic device.

In an embodiment, the I/O module 106 is further configured to be in operative communication with a user interface (UI), such as a display screen of the electronic device. Examples of the display screen may include, but are not limited to, a light emitting diode display screen, a thin-film transistor (TFT) display screen, a liquid crystal display screen, an active-matrix organic light-emitting diode (AMO-LED) display screen and the like.

In at least one example embodiment, the various components of the apparatus 100, such as the processor 102, the memory 104 and the I/O module 106 may communicate with each other via a centralized circuit system 110. The centralized circuit system 110 may be various devices configured to, among other things, provide or enable communication between the components of the apparatus 100. In certain embodiments, the centralized circuit system 110 may be a central printed circuit board (PCB) such as a motherboard, a main board, a system board, or a logic board. The centralized circuit system 110 may also, or alternatively, include other printed circuit assemblies (PCAs) or communication channel media.

It is noted that the apparatus 100 may include fewer or more components than those depicted in FIG. 1. In an embodiment, one or more components of the apparatus 100 may be implemented as a set of software layers on top of existing hardware systems. In an exemplary scenario, the apparatus 100 may be any machine capable of executing a set of instructions (sequential and/or otherwise) so as to generate a panoramic image from a set of consecutive image frames. Moreover, the generated panoramic image may be associated with sharp quality and preclude any blurry portions therein and as such provide a pleasant and enjoyable viewing experience to a viewer.

In at least one example embodiment, the apparatus 100 is caused to receive a set of consecutive image frames. In an illustrative example, a user may provide an input such as for example a touch input on a display screen of an electronic device or an input related to a selection of a physical button on the electronic device to initiate panoramic image capture. The I/O module 106 may be configured to receive such an input from the user. The I/O module 106 may further be configured to provision the input to the processor 102, which in conjunction with instructions stored in the memory 104, may initiate capture of series of image frames using the camera 108. The user may sweep or pan the camera 108 in at least one direction, such as for example a horizontal direction, during image frame capture in order to capture a desired scene. The camera 108 may capture multiple image frames during the movement of the camera. In an illustrative example, the camera 108 may capture 30 frames per second (fps) during image frame capture corresponding to the scene.

In an embodiment, the apparatus 100 may be caused to extract a portion of a first image frame from among the set of consecutive image frames to configure an intermediate panoramic image. It is noted that the term 'intermediate panoramic image' as used herein refers to an interim stage of panoramic image generation, or in other words, the intermediate panoramic image constitutes only a portion of the final panoramic image to be generated. A user may typically initiate a sweeping or panning motion of a camera from a scene chosen by the user to be a starting point for the panoramic image capture. The first image frame may therefore include substantially relevant content for panoramic image generation as inferred by the user's preference to initiate panoramic image capture from the chosen scene. Accordingly, the apparatus 100 may be caused to extract a portion of the first image frame to serve as the intermediate panoramic image. In an illustrative example, the apparatus 100 may be caused to extract at least half a portion of the first image frame to configure the intermediate panoramic image. In an example scenario, a left-half portion of the first image frame may be extracted to configure the intermediate panoramic image.

Figure 2:
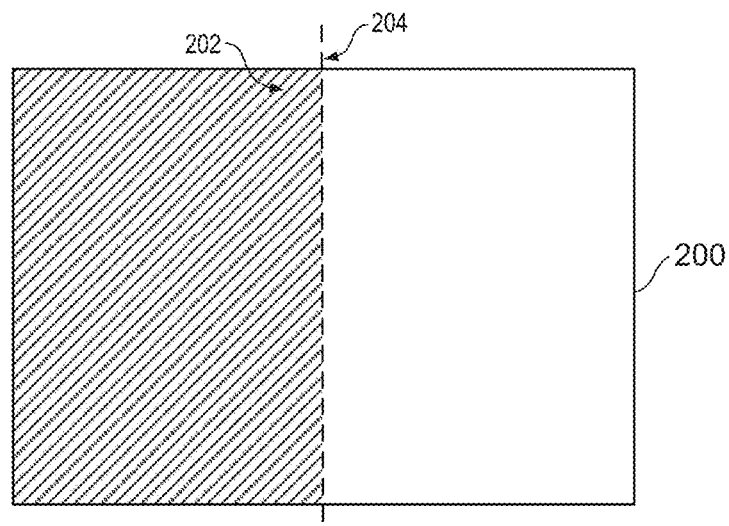
FIG. 2 shows an example portion extracted from a first image frame to configure an intermediate panoramic image, in accordance with an example embodiment.

Referring now to FIG. 2, an example portion 202 extracted from a first image frame 200 to configure an intermediate panoramic image is shown, in accordance with an example embodiment. As explained above, a user may typically initiate a sweeping or a panning motion of a camera from a scene chosen by the user to be a starting point for the panoramic image capture. The first image frame may therefore include substantially relevant content for panoramic image generation as inferred by the user's preference to initiate panoramic image capture from the chosen scene. Accordingly, the apparatus 100 may be caused to extract the portion 202 of the first image frame 200 to serve as the intermediate panoramic image. In FIG. 2, the portion 202 is depicted to constitute a left-half portion of the overall frame content of the first image frame 200 as exemplarily depicted using a central imaginary line 204. For example, if the first image frame 200 is associated with a width including 1480 pixels, then the portion 202 may be associated up to 740-pixel width portion. In some example embodiments, the apparatus 100 may be caused to extract the portion 202 from a substantially central portion of the first image frame 200. It is noted that extraction of the portion 202 from the first image frame 200 is explained herein for illustration purposes and the apparatus 100 may be caused to extract a portion of any size and from any suitable region within the first image frame 200 to configure the intermediate panoramic image.

Referring now to FIG. 1, in an embodiment, the apparatus 100 may be caused to augment the intermediate panoramic image by stitching image frame portions to the intermediate panoramic image. In an embodiment, the image frame portions to be stitched to the intermediate panoramic image may be selected from respective individual image frames in a subset of image frames including consecutive image frames from a second image frame to a penultimate image frame from among the set of consecutive image frames. In an illustrative example, a set of consecutive image frames may include 50 consecutive image frames and an intermediate panoramic image may be configured from an extracted portion of the first image frame. The intermediate panoramic image, so configured, may then be augmented by stitching image frame portions from some image frames in a subset of image frames including consecutive image frames from the second image frame to the $49^{th}$ image frame.

In an embodiment, a current state of the intermediate panoramic image may be updated after stitching each image frame portion. For example, prior to stitching any image frame portion, the current state of the intermediate panoramic image may correspond to the extracted portion from the first image frame. Thereafter, if an image frame portion from an image frame, for example a fourth image frame in the subset of image frames, is selected for stitching to the intermediate panoramic image, then the current state of the intermediate panoramic image may be updated to reflect an image frame including the extracted portion of the first image frame and the stitched image frame portion from the fourth image frame. The intermediate panoramic image may be augmented by stitching several image frame portions from the subset of image frames.

In an embodiment, each image frame portion to be stitched to the intermediate panoramic image may be chosen based on a sharpness measure and an overlap measure associated with a respective individual image frame. The stitching of the image frame portions to the intermediate panoramic image by the apparatus 100 is further explained below.

In at least one example embodiment, in order to stitch image frame portions to the intermediate panoramic image, the apparatus 100 may be caused to determine an extent of overlap between an image frame in the subset of image frames and the current state of the intermediate panoramic image. The extent of overlap may serve as the overlap measure to be determined for facilitating selection of the image frame portions to be stitched to the intermediate panoramic image. In an embodiment, the determination of the extent of overlap may be performed sequentially for the consecutive image frames in the subset of image frames. More specifically, the apparatus 100 may be caused to first determine an extent of overlap between the second image frame (i.e. the first image frame in the subset of image frames) and the current state of the intermediate panoramic image. Since the intermediate panoramic image, so far, includes only the extracted portion from the first image frame, say $I_1$, therefore, the apparatus may be caused to determine the extent of overlap (i.e. commonality in the captured scene) between the second image frame, say $I_2$, and $I_1$. In an embodiment, the apparatus 100 may be caused to utilize various known techniques for determining an amount of overlap between two image frames, such as $I_1$ and $I_2$. For example, the apparatus 100 may be caused to detect Scale-invariant feature transform (SIFT) features for various patches in an image frame and thereafter perform feature matching vis-à-vis another image frame to determine the extent of overlap. In another illustrative example, the apparatus 100 may be caused to use Features from Acceleration Segment Test (FAST) corner detection techniques to determine the extent of overlap between an image frame in the subset of image frames and the current state of the intermediate panoramic image.

In an embodiment, the apparatus 100 may further be caused to compare the extent of overlap with a predefined overlap criterion. If the extent of overlap satisfies (i.e. conforms to) the predefined overlap criterion, then the apparatus 100 may be caused to store at least a part of the image frame as an image frame portion in the buffer 112. In an embodiment, the extent of overlap may be considered to be satisfying the predefined overlap criterion if the extent of overlap is greater than or equal to a predetermined minimum extent of overlap (or $OL_{min}$) and less than or equal to a predetermined maximum extent of overlap (or $OL_{max}$). More specifically, an extent of overlap 'OL' between an image frame and the current state of the intermediate panoramic image may be considered to be satisfying the predefined overlap criterion if the extent of overlap conforms to equation (1):

$$OL_{min} \leq OL \leq OL_{max} \qquad (1)$$

Where, OL is the extent of overlap, $OL_{min}$ is predetermined minimum extent of overlap and $OL_{max}$ is predetermined maximum extent of overlap.

If it is determined that the extent of overlap between an image frame and the current state of the intermediate panoramic image satisfies equation (1), then the apparatus 100 may be caused to store at least a part of the image frame as the image frame portion in the buffer 112. In an illustrative example, the predetermined minimum amount of overlap may be '$2/5^{th}$' of the image frame, i.e. if at least 40% of the image frame is common to the intermediate panoramic image, then the extent of overlap may be considered to satisfying the predefined overlap criterion. Similarly, in an illustrative example, the predetermined maximum amount of overlap may be '$11/20^{th}$' of the image frame, i.e. if at the most 55% of the image frame is common to the intermediate panoramic image, then the extent of overlap may be considered to satisfying the predefined overlap criterion.

In an illustrative example, the apparatus 100 may store a portion of pixel width ranging from 28 pixels to 112 pixels of the image frame in the buffer 112 as the image frame portion. In some embodiments, the apparatus 100 may store the entire image frame in the buffer 112 as the image frame portion. The storage of image frame portions of different pixel-width portions is depicted in FIG. 3.

Figure 3:
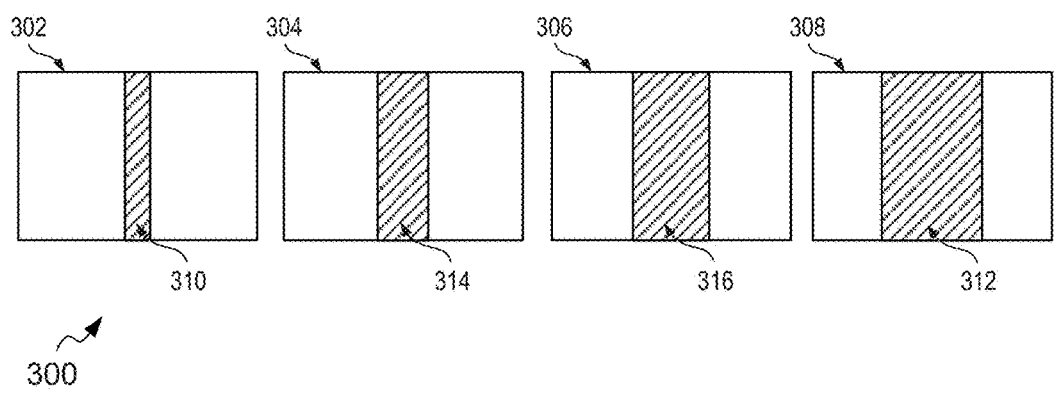
FIG. 3 shows an example representation of four image frames for illustrating respective image frame portions selected for storage in the buffer, in accordance with an example embodiment.

FIG. 3 shows an example representation 300 of four image frames for illustrating respective image frame portions selected for storage in the buffer 112, in accordance with an example embodiment. The example representation 300 depicts four image frames in form of an image frame 302, an image frame 304, an image frame 306 and image frame 308. The four image frames 302-308 may be a part of a subset of image frames including consecutive image frames from the second image frame to the penultimate image frame in the set of consecutive image frames.

Each of the four image frames 302-308 may be evaluated for determining an extent of overlap with a current state of the intermediate panoramic image and the extent of overlap may be compared with a predefined overlap criterion for the respective image frame. In an illustrative example, the extent of overlap, though satisfying the predefined overlap criterion, may be substantially large (indicative of high overlap between the image frame the current state of the intermediate panoramic image). For example, the extent of overlap may be almost 55% of the image frame area. In such a situation, an image frame portion (for example, a portion of the image frame that does not overlap with the current state of the intermediate panoramic image) of lesser width may be stored in the buffer 112. For example, an image frame portion 310 of 28-pixel width may be stored from the image frame 302. Moreover, the 28-pixel width image frame portion 310 is depicted to be selected from substantially central portion of the image frame 302. However, the 28-pixel width portion may be selected from other areas in the image frame as well.

In an illustrative example, the extent of overlap, though satisfying the predefined overlap criterion, may be substantially less (indicative of low overlap between the image frame the current state of the intermediate panoramic image). For example, the extent of overlap may be almost 40% of the image frame area. In such a situation, an image frame portion (for example, a portion of the image frame that does not overlap with the current state of the intermediate panoramic image) of higher width may be stored in the buffer 112. For example, an image frame portion 312 of 112-pixel width may be stored from the image frame 308. Moreover, the 112-pixel width image frame portion 312 is depicted to be selected from substantially central portion of the image frame 308. However, the 112-pixel width portion may be selected from other areas in the image frame as well.

Further, the example representation 300 depicts a 56-pixel width image frame portion 314 and an 84-pixel width image frame portion 316 to be selected from image frames 304 and 306, respectively for storage in the buffer 112. Accordingly, as depicted, image frame portions of varying sizes may be selected from image frames associated with an extent of overlap with the current intermediate panoramic image to be satisfying the predefined overlap criterion.

Referring now to FIG. 1, in an embodiment, the apparatus 100 may also be caused to compute a sharpness measure for the image frame and store a value of the sharpness measure along the stored image frame portion. In an illustrative example, the apparatus 100 in addition to determining the extent of overlap between the second image frame and the current state of the intermediate panoramic image, may also determine a sharpness measure for the second image frame. The value of the sharpness measure computed for the second image frame may be stored with the image frame portion of the second image frame stored in the buffer 112. In an embodiment, the sharpness measure may be computed by determining a sum of squared gradient magnitude technique. For example, an image gradient may be computed by determining a directional change in color intensity for different pixels/pixel regions. The sum of squared image gradient magnitude computation enables identification of the highest frequency components in the image frame and serves as the indication of the sharpness measure for the image frame. The sharpness measure for the image frame may be computed in several ways and may not be limited to the sum of squared gradient magnitude based sharpness measure computation.

In an embodiment, upon storing at least a part of the image frame, for example, second image frame, the apparatus 100 may be caused to determine an extent of overlap for the next image frame (for example, third image frame) in the subset of image frames. If the extent of overlap between the third image frame and the current state of the intermediate panoramic image (for example, the extracted portion of the first image frame) satisfies the predefined overlap criterion, then the apparatus 100 may be caused to store at least a part of the third image frame as an image frame portion in the buffer 112. The apparatus 100 may further be configured to repeat the operations of determination of the extent of overlap and storing image frame portions for image frames in a sequence (i.e. fourth image frame, fifth image frame and so on and so forth) until a subsequent image frame with an extent of overlap for the respective image frame not satisfying the predefined overlap criterion is encountered. In such a scenario, the apparatus 100 may be caused to identify one image frame portion associated with a highest sharpness measure from among the one or more image frame portions stored in the buffer 112. In an illustrative example, the subset of image frames may include consecutive image frames from the second image frame to the $29^{th}$ image frame. The apparatus 100 having evaluated the extent of overlap with the predefined overlap criterion for the second, third, fourth and fifth image frame may have saved image frame portions for the corresponding image frames in the buffer 112. If an extent of overlap for a subsequent image frame, i.e. the sixth image frame is determined to be not satisfying the predefined overlap criterion, then one image frame portion with the highest sharpness measure from among the image frame portions stored for the second, third, fourth and fifth image frame may be identified from the buffer 112. In an illustrative scenario, the image frame portion of the third image frame may be associated with highest sharpness measure.

In an embodiment, the apparatus 100 may be caused to stitch the identified one image portion associated with the highest sharpness measure to the intermediate panoramic image and update the current state of the intermediate panoramic image. For example, if the image frame portion of the third image frame is identified to be associated with the highest sharpness measure from among the image frame portions stored in the buffer 112, then the image frame portion of the third image frame is stitched to the intermediate panoramic image and the current state of the panoramic image may be updated to reflect the augmentation of the image frame portion to the intermediate panoramic image.

In an embodiment, the stitching of the identified image frame portion to the intermediate panoramic image may first involve aligning the two image components to be stitched together by determining an appropriate mathematical model relating pixel coordinates in the image frame portion to pixel coordinates in the intermediate panoramic image. Further, distinctive features may be identified in each image component and then matched to establish correspondences between the image frame portion and the intermediate panoramic image. Well-known techniques, such as RANSAC or random sample consensus may be used to establish the correspondence. Thereafter, the image frame portion may be seamlessly blended to the intermediate panoramic image. The image blending process may further entail color correction to match the adjoining areas of the component image frames for color, contrast, and brightness to avoid visibility of the seams, dynamic range extension, and motion compensation, such as deghosting and deblurring, to compensate for moving objects.

In an embodiment, upon stitching of the one image frame portion to the intermediate panoramic image, the apparatus 100 may be caused to discard the one image frame portion and image frame portions stored in the buffer 112 prior to the storage of the one image frame portion. For example, if the image frame portion of the third image frame is stitched to the intermediate panoramic image, then that image frame portion and any image frame portion previously stored in buffer 112 (i.e. stored prior to the storage of the image frame portion of the third image frame) may be discarded. It is noted that the remaining image frame portions in the buffer 112 may be retained.

In an illustrative example, the apparatus 100 having evaluated the extent of overlap with the predefined overlap criterion for the second, third, fourth and fifth image frame may have saved image frame portions for the corresponding image frames in the buffer 112. If an extent of overlap for a subsequent image frame, i.e. the sixth image frame is determined to be not satisfying the predefined overlap criterion, then one image frame portion with the highest sharpness measure may be identified from the buffer 112. In an illustrative scenario, the image frame portion of the third image frame may be associated with highest sharpness measure and accordingly, the image frame portion from the third image frame may be stitched to the intermediate panoramic image. In such a scenario, the image frame portion of the third image frame and an image frame portion of the second image frame (i.e. the image frame portion stored prior to the storage of the image frame portion of the third image frame) may be discarded. However, image frame portions of the fourth and fifth image frames may be retained in the buffer 112. Further, an image frame portion of the subsequent image frame, i.e. the sixth image frame may also be added to the buffer 112.

In an embodiment, the apparatus 100 may be caused to repeat the steps of operations of determining, storing, identifying and stitching for remaining image frames in the subset of image frames, until all the image frames in the subset of image frames are evaluated.

In an embodiment, the buffer 112 may comprise a plurality of buffer portions. Each buffer portion may be associated with a respective overlap limit and may be configured to store at least one image frame portion based on the respective overlap limit. In an illustrative example, the buffer 112 may include four buffer portions. The first buffer portion may be associated with an overlap limit of 28-pixel width indicative that the first buffer portion is configured to store image frame portions up to 28-pixel width; the second buffer portion may be associated with an overlap limit of 56-pixel width indicative that the second buffer portion is configured to store image frame portions up to 56-pixel width; the third buffer portion may be associated with an overlap limit of 84-pixel width indicative that the third buffer portion is configured to store image frame portions up to 84-pixel width; and the fourth buffer portion may be associated with an overlap limit of 112-pixel width indicative that the fourth buffer portion is configured to store image frame portions up to 112-pixel width. In an embodiment, each buffer portion may be configured to store several image frame portions with corresponding sharpness measures. In another embodiment, each buffer portion is configured to retain only one image frame portion associated with a highest sharpness measure. For example, if the first buffer includes one image frame portion associated with a sharpness measure value of '$S_1$' and if another image frame portion associated with a sharpness measure value of '$S_2$' is a candidate for storage to the first buffer portion, then the first buffer may retain the image frame with higher value of sharpness measure, i.e. the initially stored image frame portion may be retained if $S_1 > S_2$, or the new image frame portion may be retained while discarding the previously stored image frame portion if $S_2 > S_1$. If the sharpness measure value of two image frame portions are equal than any one of the two image frame portions may be retained in the buffer. In an illustrative example, each of the four buffer portions may each store one image frame portion, and when a subsequent image frame associated with an extent of overlap not satisfying the predefined overlap criterion is encountered, then one of the four image portions with highest value of the sharpness measure may be selected for stitching to the intermediate panoramic image as explained above.

The intermediate panoramic image may be augmented several times by stitching image frame portions from several image frames from among the subset of image frames.

In an embodiment, the apparatus 100 may be caused to stitch a portion of a last image frame from among the set of consecutive image frames to the augmented intermediate panoramic image to configure the panoramic image. A user may typically stop a sweeping or panning motion of a camera at a scene chosen by the user to be an ending point for the panoramic image capture. The last image frame may therefore include substantially relevant content for panoramic image generation as inferred by the user's preference to terminate panoramic image capture at the chosen scene. Accordingly, the apparatus 100 may be caused to extract a portion of the last image frame to serve as the intermediate panoramic image. In an embodiment, at least half a portion of the last image frame may be stitched to the augmented intermediate panoramic image to configure the panoramic image. For example, if the last image frame is associated with a width including 1480 pixel, then a 740-pixel width portion may be extracted from the last image frame. In an example embodiment, the apparatus 100 may be caused to extract a right-half portion of the last image frame to configure the final panoramic image. It is noted that extraction of the portion from the last image frame is explained herein for illustration purposes and the apparatus 100 may be caused to extract a portion of any size and from any suitable region within the last image frame to configure the final panoramic image. In an embodiment, the apparatus 100 may be caused to display the panoramic image on a display associated with an electronic device subsequent to configuring the panoramic image.

It is noted that though the generation of panoramic images is explained herein by comparing an extent of overlap of image frames with a predefined overlap criterion, however, in some embodiments, the apparatus 100 may instead determine an extent of disparity between the image frames and the intermediate panoramic image and compare the extent of disparity measure with a predefined disparity criterion to facilitate generation of the panoramic image. Such a generation of a panoramic image is explained below:

In an example embodiment, the apparatus 100 may be caused to receive a set of consecutive image frames. The apparatus 100 may be caused to extract a portion of a first image frame from among the set of consecutive image frames to configure an intermediate panoramic image. The reception of the set of consecutive image frames and the extraction of the portion from the first image frame may be performed as explained above and is not explained herein. In an embodiment, the apparatus 100 may be caused to augment the intermediate panoramic image by stitching image frame portions to the intermediate panoramic image. The image frame portions may be selected from individual image frames in a subset of image frames including consecutive image frames from a second image frame to a penultimate image frame from among the set of consecutive image frames.

To select the image frame portions, the apparatus 100 may be caused to sequentially determine an extent of disparity (i.e. an amount of difference) between an image frame in the subset of image frames and a current state of the intermediate panoramic image and store at least a part of the image frame as an image frame portion in the buffer if the extent of disparity satisfies a predefined disparity criterion. For example, the extent of disparity may be considered to be satisfying the predefined disparity criterion if the extent of disparity (or $\Delta$) is less than or equal to a predetermined maximum extent of disparity (or $\Delta_{max}$) and greater than or equal to a predetermined minimum extent of disparity (or $\Delta_{min}$). More specifically, an extent of disparity between an image frame and the current state of the intermediate panoramic image may be considered to be satisfying the predefined disparity criterion if the extent of disparity conforms to equation (2):

$$\Delta_{max} \leq \Delta \leq \Delta_{min} \qquad (2)$$

Where, $\Delta$ is the extent of disparity, $\Delta_{min}$ is predetermined minimum extent of disparity and $\Delta_{max}$ is predetermined maximum extent of disparity.

If it is determined that the extent of disparity between an image frame the current state of the intermediate panoramic image satisfies equation (2), then the apparatus 100 may be caused to store at least a part of the image frame as the image frame portion in the buffer 112. The subsequent operations of identifying the one image frame portion with highest sharpness measure and stitching the one image frame portion to the intermediate panoramic image may be performed as explained above and is not repeated herein. Several image frame portions may be stitched to the intermediate panoramic image by repeating the operations of determining the extent of disparity, storing at least a part of the image frame as image frame portion, identifying the one image frame portion with the highest sharpness measure from the buffer and stitching the identified one image frame portion to the intermediate panoramic image, for the remaining frames in the subset of image frames. The generation of a panoramic image is explained with reference to an illustrative example in FIG. 4.

Figure 4:
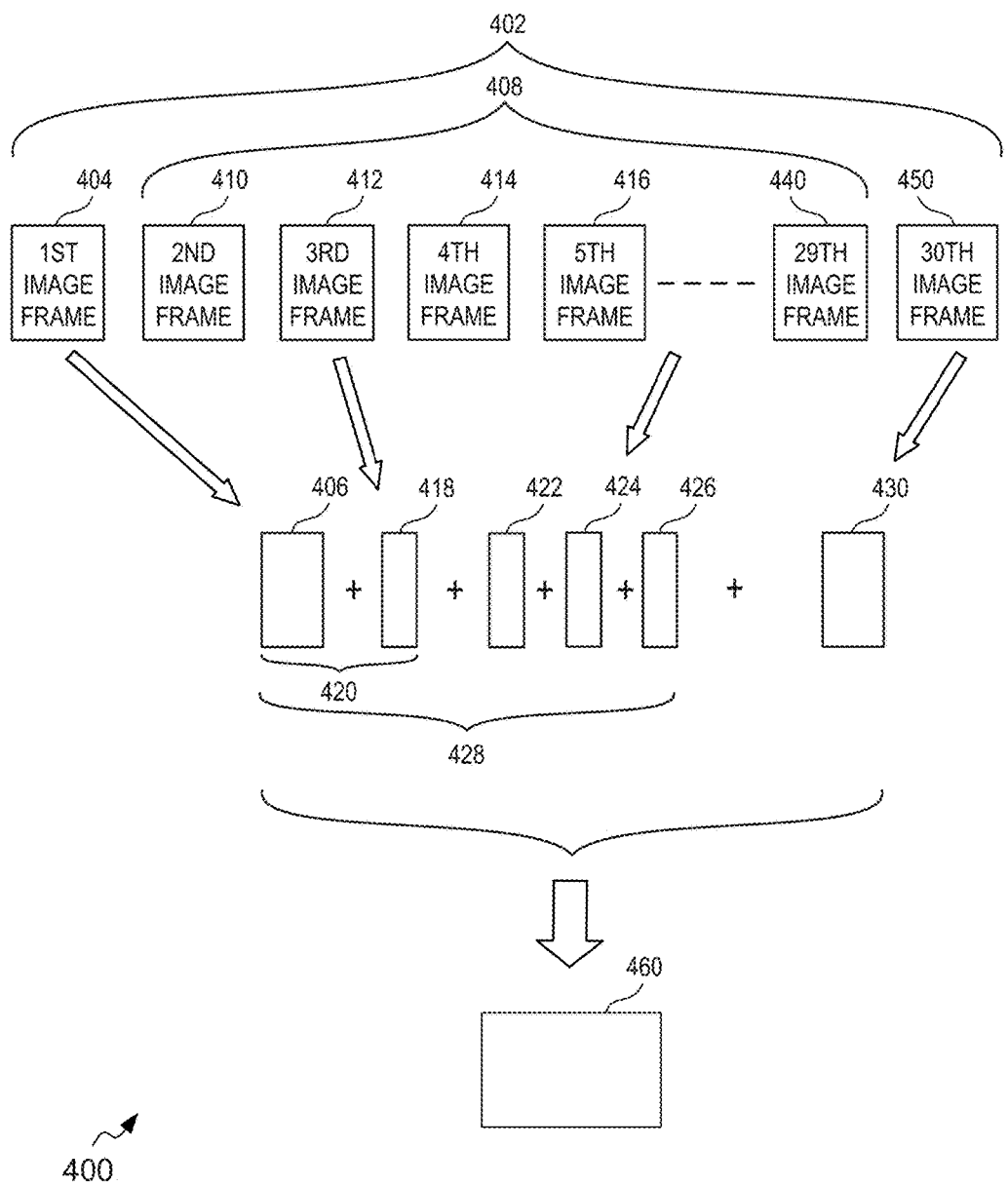
FIG. 4 shows an example representation for illustrating a generation of a panoramic image from a set of consecutive image frames by the apparatus of FIG. 1, in accordance with an example embodiment.

Referring now to FIG. 4, an example representation 400 for illustrating a generation of a panoramic image from a set of consecutive image frames by the apparatus 100 of FIG. 1 is shown, in accordance with an example embodiment. The example representation 400 depicts a set of consecutive image frames 402 including 30 consecutive image frames (i.e. from $1^{st}$ image frame to the $30^{th}$ image frame). A set of 30 consecutive image frames is depicted herein for illustrative purposes, and the set of consecutive image frames captured during a panoramic image capture by the user may include any number of consecutive image frames.

In an embodiment, the apparatus 100 of FIG. 1 is configured to receive the set of consecutive image frames 402 from an image capture device, such as the camera 108, explained with reference to FIG. 1. The apparatus 100 is configured to extract a portion of the $1^{st}$ image frame, exemplarily depicted to be image frame 404, to configure an intermediate panoramic image 406. As explained with reference to FIG. 1, the $1^{st}$ image frame may include substantially relevant scene content as inferred from the choice of the user to initiate panoramic scene capture from that scene content onwards. Accordingly, the apparatus 100 is configured to extract a portion from the image frame 404 to configure the intermediate panoramic image 406. Further as explained with reference to FIG. 2, in some example scenarios, the apparatus 100 may be configured to extract a left-half portion of the first image frame to configure the intermediate panoramic image.

Further, as explained with reference to FIG. 1, the apparatus 100 is configured to augment the intermediate panoramic image by stitching image frame portions to the intermediate panoramic image. The image frames portions are selected from individual image frames in a subset of image frames 408 including consecutive image frames from a $2^{nd}$ image frame (also depicted as image frame 410) to a penultimate image frame, i.e. the $29^{th}$ image frame (also depicted as image frame 440). The selection of the image frame portions from image frames in the subset of image frames 408 is further explained below.

In an embodiment, the apparatus 100 is configured to sequentially perform operations of determining an extent of overlap between an image frame in the subset of image frames 408 and a current state of the intermediate panoramic image 406 and compare the extent of overlap with a predefined overlap criterion. If the extent of overlap between an image frame and the current state of the intermediate panoramic image satisfies the predefined overlap criterion than at least a part of the image frame is stored as an image frame portion in the buffer 112. Furthermore, a sharpness measure of the image frame is computed and stored along with the image frame portion.

The operations of determining the extent of overlap and storing at least a part of the image frame are sequentially performed until a subsequent image frame associated with an extent of overlap not satisfying the predefined overlap criterion is encountered. Upon encountering such an image frame, one image frame portion with a highest sharpness measure from one or more image frame portions stored in the buffer may be identified and subsequently stitched to the intermediate panoramic image. For example, if the $2^{nd}$, $3^{rd}$ and $4^{th}$ image frames (also depicted as image frames 410, 412 and 414 in FIG. 4) are associated with an extent of overlap satisfying a predefined overlap criterion, then an image frame portion for each of the three image frames may be stored in the buffer 112. The storage of the image frame portions corresponding to the image frames 410, 412 and 414 in the buffer 112 is not shown in FIG. 4. If the $5^{th}$ image frame, i.e. image frame 416, is associated with an extent of overlap not satisfying the predefined overlap criterion, then one image frame portion associated with a highest sharpness measure from among the image frame portions stored corresponding to the image frames 410, 412 and 414 may be identified. In an illustrative example, an image frame portion 418 corresponding to the image frame 412 may be associated with the highest sharpness measure. In such a scenario, the image frame portion 418 may be stitched to the intermediate panoramic image 406 and a current state of the intermediate panoramic image may be updated to reflect inclusion of the image frame portion 418. More specifically, the current state of the intermediate panoramic image may be an image comprising content as indicated by the label 420.

In an embodiment, the apparatus 100 may be caused to discard the image frame portion 418 corresponding to the image frame 412 and any image frame portions stored previously, such as for example, image frame portion corresponding to the image frame 410, from the buffer 112. Accordingly, the buffer may include only an image frame portion corresponding to the image frame 414. The apparatus 100 may also be caused to determine the extent of overlap between the image frame 416 and the current state of the intermediate panoramic image as depicted by the label 420 and store an image frame portion from the image frame 416 in the buffer. The process of determining extent of overlap, storing image frame portions, identifying one image frame portion and stitching the image frame portion to the intermediate panoramic image may be repeated until all image frames in the subset of image frames 408 are evaluated. In an example scenario, image frame portions 422, 424 and 426 are depicted to be stitched to the intermediate panoramic image 406 to configure the augmented intermediate panoramic image as depicted by label 428.

In an embodiment, the apparatus 100 is caused to extract a portion 430 from the last image frame, i.e. image frame 450 and stitch the portion 430 to the augmented intermediate panoramic image 428 to configure the panoramic image 460. As explained with reference to FIG. 1, the last image frame may include substantially relevant scene content as inferred from the choice of the user to terminate panoramic scene capture from that scene content. Accordingly, the apparatus 100 is configured to extract a portion 430 from the image frame 450 and stitch the portion 430 to the augmented intermediate panoramic image 428 to configure the final panoramic image 460. Further as explained with reference to FIG. 1, in some example scenarios, the apparatus 100 may be configured to extract up to half an image frame portion of the last image frame. In an example embodiment, the apparatus 100 may be caused to display the panoramic image 460 on a display of an electronic device for viewing pleasure of the user.

Figure 5A:
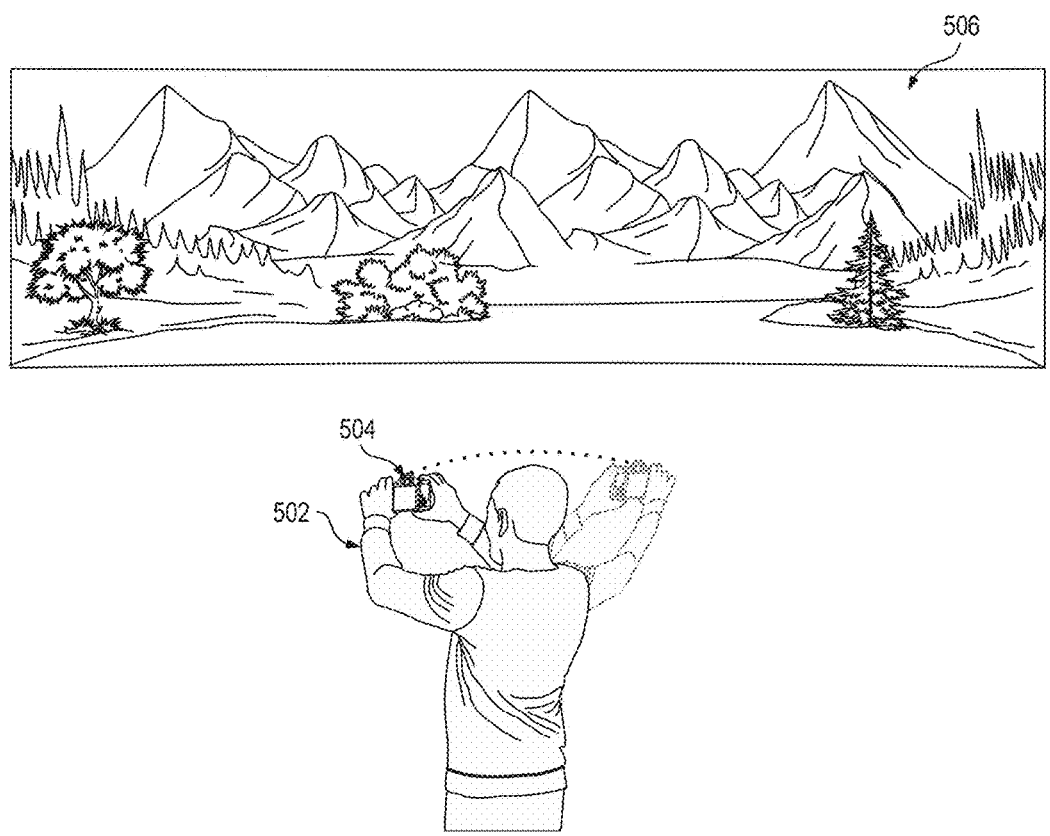
FIGS. 5A-5C depict a panoramic image generated by stitching a set of consecutive image frames captured corresponding to a scene, in accordance with an example embodiment.
Figure 5B:
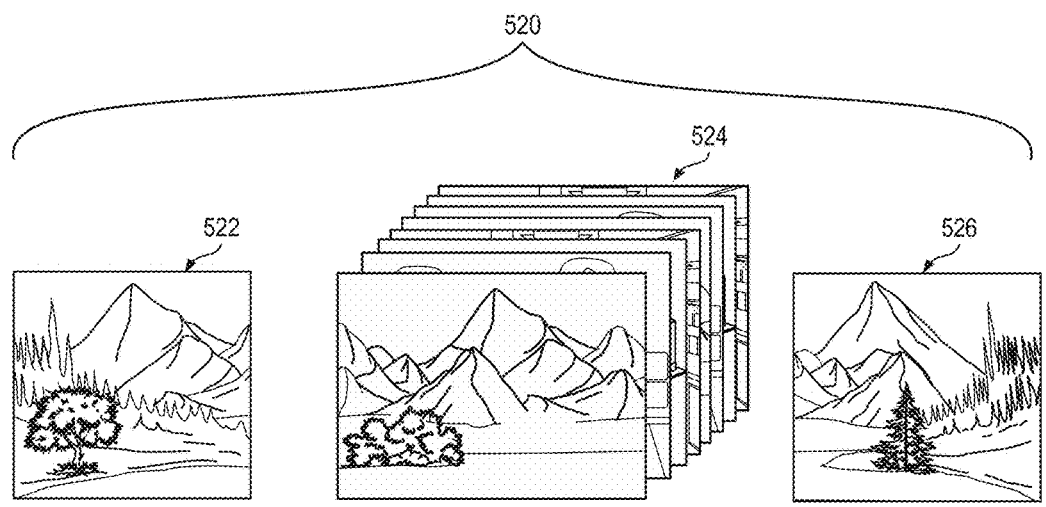
Figure 5C:
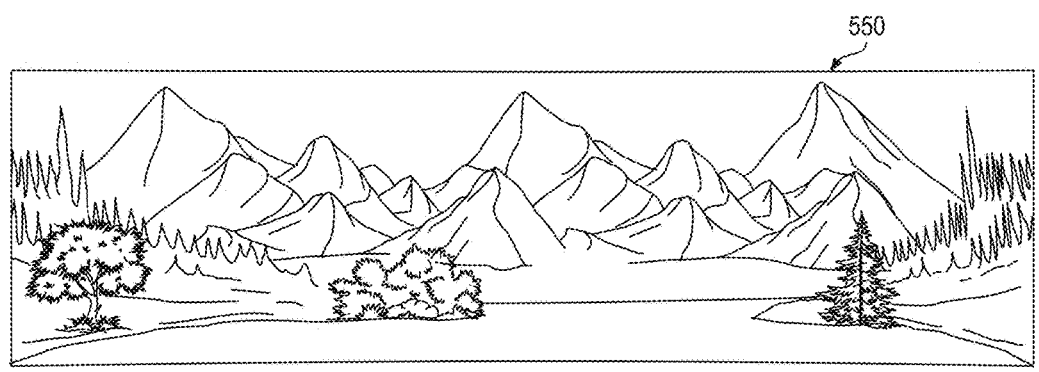

FIGS. 5A-5C depict a panoramic image generated by stitching a set of consecutive image frames captured corresponding to a scene, in accordance with an example embodiment. More specifically, FIG. 5A depicts a user 502 rotating a camera 504 in a horizontal direction for capturing a panoramic image corresponding to a scene 506. The user 502 may select an appropriate mode in the camera 504 for capturing a panoramic image. For example, in many camera phones or camera devices, a 'panorama capture mode' or a 'sweep panorama' mode may be provisioned to enable users, such as the user 502 to capture panoramic images. Upon selection of such a mode, a user may rotate a camera in a desired direction (for example, rotate along a z-axis) to capture a scene that is larger than a scene that can typically be accommodated in a single image. In the panoramic capture mode, the camera may be configured to capture multiple image frames per second (for example, 30 frames per second) as the camera rotates during scene capture to configure a set of consecutive image frames. An apparatus, such as the apparatus 100 of FIG. 1 may be configured to receive the set of consecutive image frames and generate a panoramic image as explained with reference to FIG. 1.

FIG. 5B depicts a set of consecutive image frames 520 in accordance with an example embodiment. For the sake of description, the set of consecutive image frames 520 are depicted to include a first image frame 522, a subset of image frames 524 including consecutive image frame from the second image frame to the penultimate image frame, and a last image frame 526. As explained with reference to FIGS. 1 to 4, the apparatus 100 may be configured to extract a portion of the first image frame 522 to configure an intermediate panoramic image and stitch image frame portions selected from some individual image frames in the subset of the image frames 524 to configure an augmented intermediate panoramic image. The apparatus 100 may further be configured to extract a portion from the last image frame 526 and stitch the extracted portion to the augmented intermediate panoramic image to configure a panoramic image. Such a configured panoramic image 550 is depicted in FIG. 5C.

Figure 6:
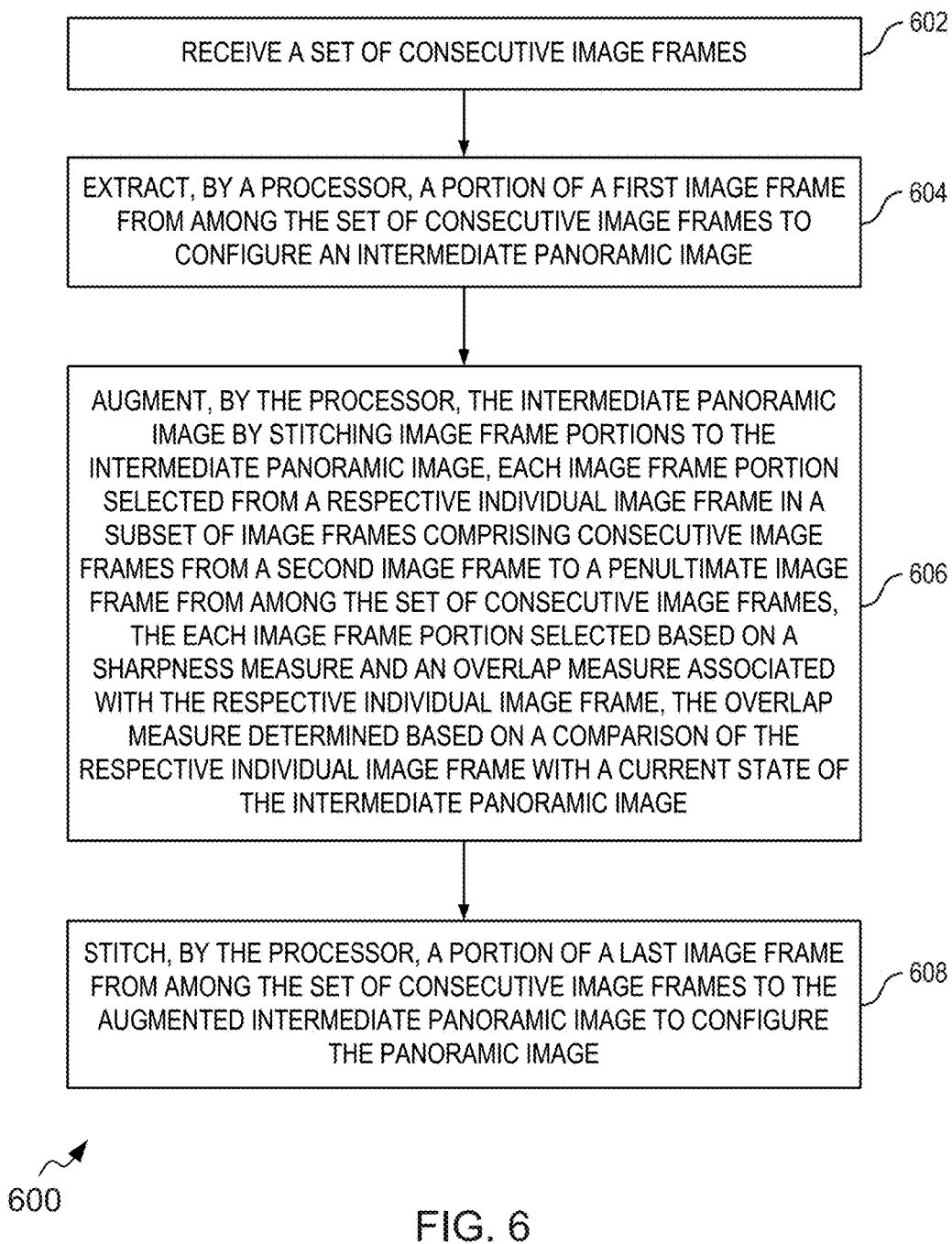
FIG. 6 illustrates an example flow diagram of a method for generating a panoramic image from a set of consecutive image frames, in accordance with an example embodiment.

A flow diagram for generating a panoramic image from a set of consecutive image frames is depicted in FIG. 6.

FIG. 6 illustrates an example flow diagram of a method 600 for generating a panoramic image from a set of consecutive image frames, in accordance with an example embodiment. Operations of the method 600 may be performed by, among other examples, the apparatus 100 of FIG. 1.

At 602, the method 600 includes receiving a set of consecutive image frames. In an illustrative example, a user may provide an input such as for example a touch input on a display screen of an electronic device or an input related to a selection of a physical button on the electronic device to initiate a panoramic image capture. A camera may initiate capture of series of image frames upon receiving the input. The user may sweep or pan the camera in at least one direction, such as for example a horizontal direction, during image frame capture in order to capture a desired scene. The camera may capture multiple image frames during the movement of the camera. In an illustrative example, the camera may capture 30 frames per second (fps) during image frame capture corresponding to the scene. The image frames captured during panoramic image capture may configure the set of consecutive image frames.

At 604, the method 600 includes extracting a portion of a first image frame from among the set of consecutive image frames to configure an intermediate panoramic image. As explained with reference to FIG. 1, a user may typically initiate a sweeping or panning motion of a camera from a scene chosen by the user to be a starting point for the panoramic image capture. The first image frame may therefore include substantially relevant content for panoramic image generation as inferred by the user's preference to initiate panoramic image capture from the chosen scene. Accordingly, a portion of the first image frame may be extracted to serve as the intermediate panoramic image, i.e. an image constituting only a portion of the final panoramic image to be generated. In an illustrative example, at least half a portion of the first image frame may be extracted to configure the intermediate panoramic image. In an example scenario, a left-half portion of the first image frame may be chosen to configure the intermediate panoramic image, as exemplarily depicted in FIG. 2.

At 606, the method 600 includes augmenting the intermediate panoramic image by stitching image frame portions to the intermediate panoramic image. The image frame portions may be selected from some image frames in a subset of image frames including consecutive image frames from a second image frame to a penultimate image frame from among the set of consecutive image frames. An overlap measure and a sharpness measure may be determined for each image frame in the subset of image frames. An extent of overlap may be determined by comparing the respective image frame with a current state of the intermediate panoramic image to serve as the overlap measure. The extent of overlap may be compared with a predefined overlap criterion and if it is determined that the extent of overlap satisfies the predefined overlap criterion, then at least a part of the image frame may be stored as the image frame portion in a buffer, such as the buffer 112 depicted in FIG. 1. A sharpness measure of the corresponding image frame is also stored along the image frame portion. In an illustrative example, the sharpness measure may be computed using sum of squared gradient magnitude technique as explained with reference to FIG. 1.

The determination of the extent of overlap and the subsequent storage of the image frame portion may be sequentially performed until a subsequent image frame associated with an extent of overlap not satisfying the predefined overlap criterion is encountered. In such a scenario, one image frame portion associated with a highest sharpness measure is identified from one or more image frame portions stored in the buffer and the identified one image frame portion is stitched to the intermediate panoramic image. Upon stitching the one image frame portion to the intermediate panoramic image, the one image frame portion along with one or more image frame portions previously stored in the buffer are discarded. The process of determining the extent of overlap, storing the image frame portions in the buffer, identifying one image frame portion associated with highest sharpness measure and stitching the one image frame portion to the intermediate panoramic image may be repeated for remaining image frames in the subset of image frames. The intermediate panoramic image may be augmented by stitching several image frame portions as explained with reference to an illustrative example in FIG. 4.

At 608, the method 600 includes stitching a portion of a last image frame from among the set of consecutive image frames to the augmented intermediate panoramic image to configure the panoramic image. A user may typically stop a sweeping or panning motion of a camera at a scene chosen by the user to be an ending point for the panoramic image capture. The last image frame may therefore include substantially relevant content for panoramic image generation as inferred by the user's preference to terminate panoramic image capture at the chosen scene. In an embodiment, at least half a portion of the last image frame may be stitched to the augmented intermediate panoramic image to configure the panoramic image. In an embodiment, the panoramic image generated in such a manner may be displayed to the user on a display screen of an electronic device associated with the user. Another method for generating a panoramic image from a set of consecutive image frames is explained with reference to FIGS. 7A and 7B.

Figure 7A:
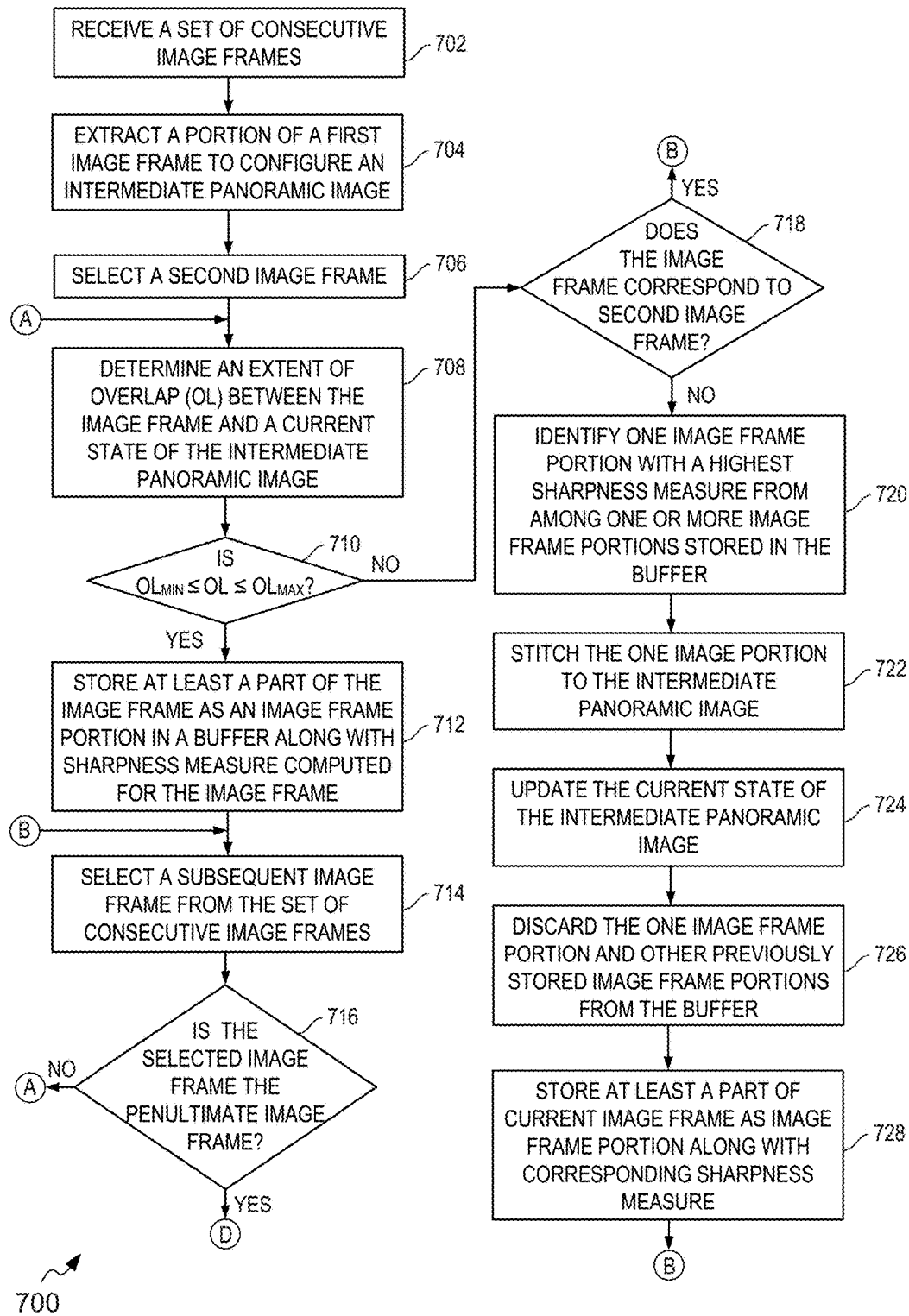
FIGS. 7A-7B illustrate an example flow diagram of a method for generating a panoramic image from a set of consecutive image frames, in accordance with another example embodiment.
Figure 7B:
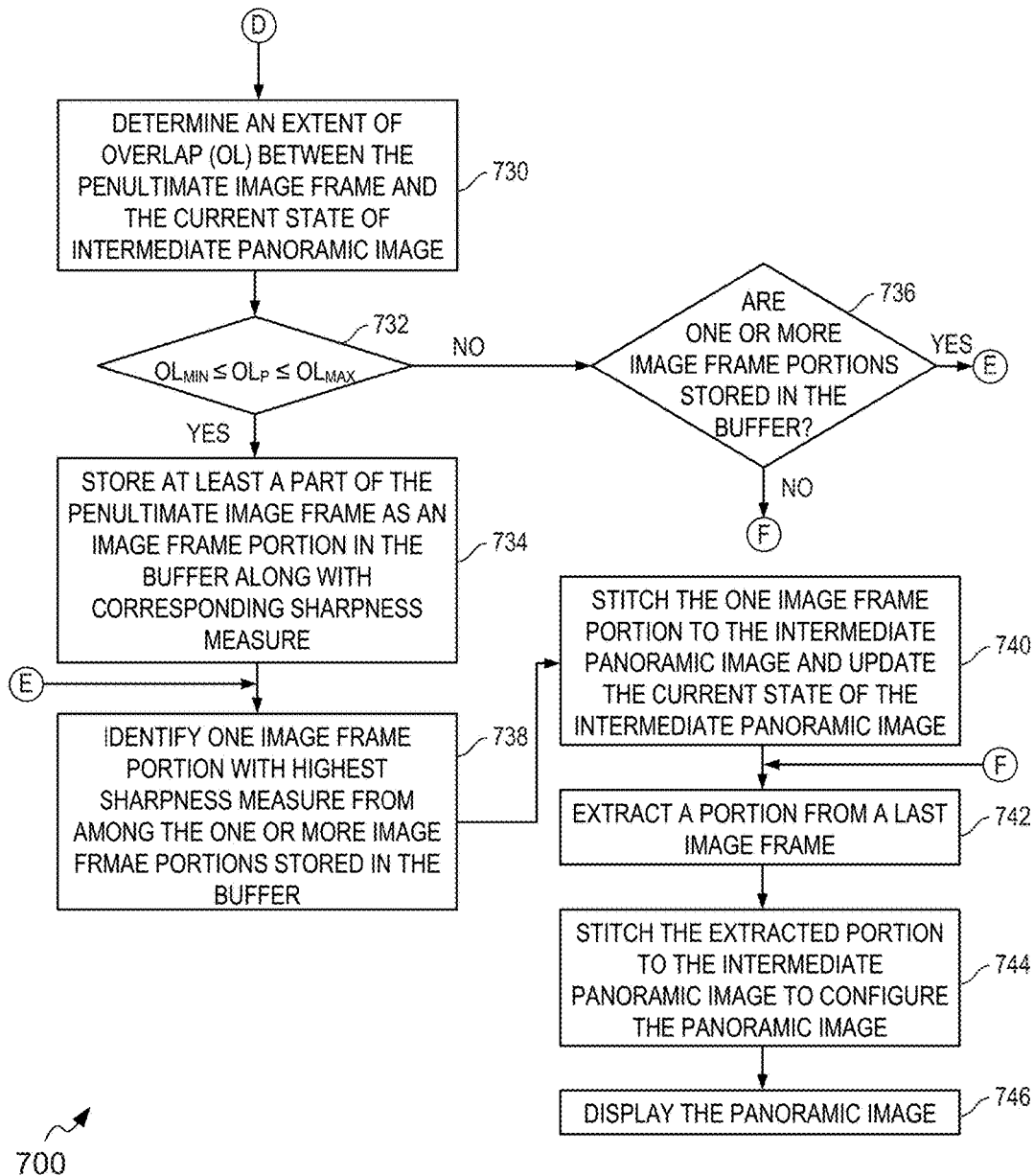

FIGS. 7A-7B illustrates an example flow diagram of a method 700 for generating a panoramic image from a set of consecutive image frames, in accordance with an example embodiment. Operations of the method 700 may be performed by, among other examples, the apparatus 100 of FIG. 1.

At 702, the method 700 includes receiving a set of consecutive image frames.

At 704, the method 700 includes extracting a portion of a first image frame from among the set of consecutive image frames to configure an intermediate panoramic image.

At 706, the method 700 includes selecting a second image frame from among the set of consecutive image frames.

At 708, the method 700 includes determining an extent of overlap (OL) between the image frame and a current state of the intermediate panoramic image.

At 710, the method 700 includes determining if the extent of overlap (OL) satisfies a predefined overlap criterion by checking if OL is greater than or equal to a predetermined minimum overlap ($OL_{min}$) and less than or equal to a predetermined maximum overlap ($OL_{max}$). If OL satisfies the predefined overlap criterion, then 712 is performed, else 718 is performed.

At 712, the method 700 includes storing at least a part of the image frame as an image frame portion in a buffer along with a sharpness measure computed for the image frame.

At 714, the method 700 includes selecting a subsequent image frame from among the set of consecutive image frames.

At 716, the method 700 includes checking if the subsequent image frame the penultimate image frame from among the set of consecutive image frames.

If it is determined that the subsequent image frame is not the penultimate image frame, then operations from 708 of the method 700 are repeated. If it is determined that the subsequent image frame is the penultimate image frame then 730 is performed.

As explained above, if OL for an image frame does not satisfy the predefined overlap criterion than 718 is performed. At 718, the method 700 includes determining if the image frame corresponds to the second image frame. More specifically, it is determined if the image frame is the second image frame or not. If yes, then operations 714 onwards of the method 700 are performed. If the image frame does not correspond to the second image frame, then 720 is performed.

At 720, the method 700 includes identifying one image frame portion with a highest sharpness measure from among the one or more image frame portions stored in the buffer.

At 722, the method 700 includes stitching the one image frame portion to the intermediate panoramic image.

At 724, the method 700 includes updating the current state of the intermediate panoramic image to reflect the stitching of the one image frame portion to the intermediate panoramic image.

At 726, the method 700 includes discarding the one image frame portion and other previously stored image frame portions from the buffer.

At 728, the method 700 includes storing at least a part of the current image frame as an image frame portion along with a corresponding sharpness measure based on a comparison with the current state of the intermediate panoramic image. More specifically, the subsequent image frame which did not satisfy the predefined overlap criterion upon comparison with pre-updated state of the intermediate panoramic image may now be compared with the current state of the intermediate panoramic image to determine an extent of overlap and subsequently a part of the image frame may be stored as an image frame portion in the buffer. Thereafter, 714 is performed.

If it is determined that the subsequent image frame is the penultimate image frame then 730 is performed. At 730, the method 700 determining an extent of overlap between the penultimate image frame and the current state of the intermediate panoramic image. At 732, the method 700 includes determining if the extent of overlap '$OL_p$' for the penultimate image frame satisfies the predefined overlap criterion. More specifically, it is determined if $OL_p$ is greater than or equal to $OL_{min}$ and less than or equal to $OL_{max}$. If yes, then 734 is performed, else 736 is performed. At 734, the method 700 includes storing at least a part of the penultimate image frame as an image frame portion in the buffer along with a corresponding sharpness measure.

At 736, it is determined if one or more image frame portions are present in the buffer. If yes, then 738 onwards is performed, else 742 onwards is performed. At 738, the method 700 includes identifying one image frame portion with a highest sharpness measure from the one or more image frame portions stored in the buffer. At 740, the method 700 includes stitching the one image frame portion to the intermediate panoramic image and updating the current state of the intermediate panoramic image. At 742, the method 700 includes extracting a portion from a last image frame. At 744, the method 700 includes stitching the extracted portion to the intermediate panoramic image to configure the panoramic image. At 744, the method 700 includes displaying the panoramic image to a viewer.

The disclosed methods 600 and 700 can be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer or image processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 8:
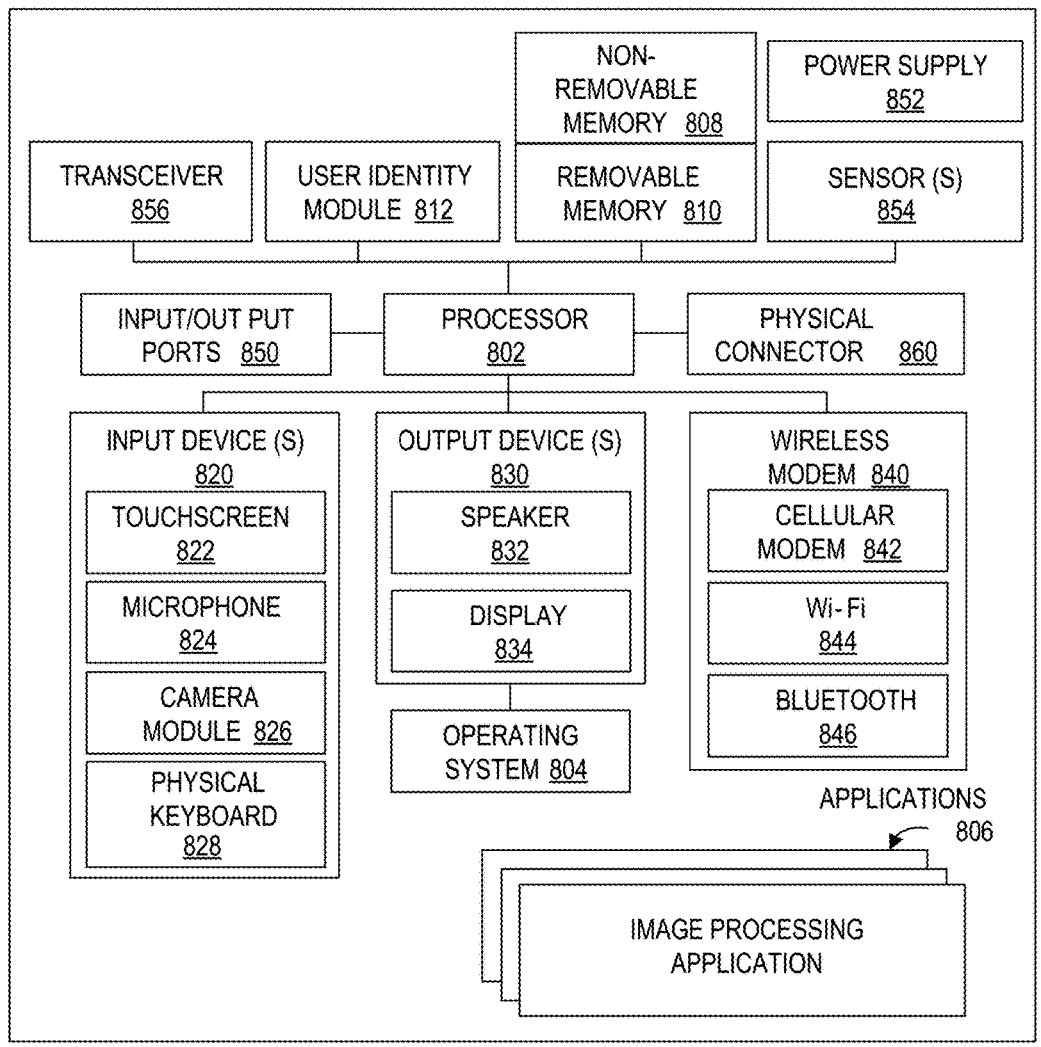
FIG. 8 illustrates an example of a mobile device capable of implementing example embodiments described herein.

Referring now to FIG. 8, a schematic block diagram of a mobile device 800 is shown that is capable of implementing embodiments of techniques for generating panoramic images as described herein. The mobile device 800 as illustrated and hereinafter described is merely illustrative of one type of device and shall not be taken to limit the scope of the embodiments. As such, it should be appreciated that at least some of the components described below in connection with the mobile device 800 may be optional and thus in an example embodiment may include more, less or different components than those described in connection with the example embodiment of FIG. 8. As such, among other examples, the mobile device 800 could be any of device from among mobile electronic devices, such as for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 800 includes a controller or a processor 802 (e.g., a signal processor, microprocessor, ASIC, or other control and processing logic circuitry) for performing tasks such as signal coding, data processing, image processing, input/output processing, power control, and/or other functions. An operating system 804 controls the allocation and usage of the components of the mobile device 800 and support for one or more applications programs (see, applications 806), configured to support panoramic image generation, that implements one or more of the innovative features described herein. In addition to image processing application; the application programs may include common mobile computing applications (e.g., telephony applications, email applications, calendars, contact managers, web browsers, messaging applications) or any other computing application.

The illustrated mobile device 800 includes one or more memory components, for example, a non-removable memory 808 and/or removable memory 810. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. Examples of data can include web pages, text, images, sound files, image data, video data to be sent to and/or received from one or more network servers or other devices via one or more wired or wireless networks. The mobile device 800 may further include a user identity module (UIM) 812. The UIM 812 may be a memory device having a processor built in. The UIM 812 may include, for example, a SIM, a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile device 800 can support one or more input devices 820 and one or more output devices 830. Examples of the input devices 820 may include, but are not limited to, a touch screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video image frames) and a physical keyboard 828. Examples of the output devices 830 may include, but are not limited to a speaker 832 and a display 834. Other possible output devices (not shown) can include piezoelectric or other haptic output devices. Some devices can serve more than one input/output function. For example, the touch screen 822 and the display 834 can be combined into a single input/output device.

In an embodiment, the camera module 826 may include a digital camera capable of capturing a series of image frames. In some implementations, the camera module 826 may include two or more cameras, for example, a front camera and a rear camera positioned on two sides of the mobile device 800 (e.g., in a mobile device). As such, the camera module 826 includes all hardware, such as a lens or other optical component(s), and software for capturing a series of image frames. Alternatively, the camera module 826 may include the hardware needed to view the panoramic image, while a memory device of the mobile device 800 stores instructions for execution by the processor 802 in the form of software to create a panoramic image from captured series of image frames. In an example embodiment, the camera module 826 may further include a processing element such as a co-processor, which assists the processor 802 in processing image frame data and an encoder and/or decoder for compressing and/or decompressing image data. In an embodiment, the camera module 826 may provide live image data (viewfinder image data) to the display 834.

A wireless modem 840 can be coupled to one or more antennas (not shown in FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the mobile device and a public switched telephone network (PSTN).

The mobile device 800 can further include one or more input/output ports 850, a power supply 852, one or more sensors 854 for example, an accelerometer, a gyroscope, a compass, or an infrared proximity sensor for detecting the orientation or motion of the mobile device 800, a transceiver 856 (for wirelessly transmitting analog or digital signals)

and/or a physical connector 860, which can be a USB port, IEEE 1394 (FireWire) port, and/or RS-232 port. The illustrated components are not required or all-inclusive, as any of the components shown can be deleted and other components can be added.

With the image frame processing applications and/or other software or hardware components, the mobile device 800 can implement the technologies described herein. For example, the processor 802 can facilitate capture of series of image frames of a scene through the camera module 826 and perform post-processing of the captured series of image frames.

Although the mobile device 800 is illustrated in FIG. 8 in form of a smartphone, but more particularly, the techniques and solutions described herein can be implemented with connected devices having other screen capabilities and device form factors, such as a tablet computer, a virtual reality device connected to a mobile or desktop computer, an image sensor attached to a gaming console or television, and the like.

An embodiment of a method for generating a panoramic image from a set of consecutive image frames comprises:
  receiving the set of consecutive image frames;
  extracting, by a processor, a portion of a first image frame from among the set of consecutive image frames to configure an intermediate panoramic image;
  augmenting, by the processor, the intermediate panoramic image by stitching image frame portions to the intermediate panoramic image, each image frame portion selected from a respective individual image frame in a subset of image frames comprising consecutive image frames from a second image frame to a penultimate image frame from among the set of consecutive image frames, the each image frame portion selected based on a sharpness measure and an overlap measure associated with the respective individual image frame, the overlap measure determined based on a comparison of the respective individual image frame with a current state of the intermediate panoramic image; and
  stitching, by the processor, a portion of a last image frame from among the set of consecutive image frames to the augmented intermediate panoramic image to configure the panoramic image.

In one embodiment of the method stitching the image frame portions to the intermediate panoramic image comprises sequentially performing for the consecutive image frames in the subset of image frames:
  determining an extent of overlap between an image frame in the subset of image frames and the current state of the intermediate panoramic image, wherein the determined extent of overlap serves as the overlap measure for the image frame;
  storing at least a part of the image frame as an image frame portion in a buffer if the extent of overlap satisfies a predefined overlap criterion, wherein one or more image frame portions from image frames satisfying the predefined overlap criterion are stored in the buffer until a subsequent image frame not satisfying the predefined overlap criterion is encountered;
  identifying one image frame portion associated with a highest sharpness measure from among the one or more image frame portions stored in the buffer based on sharpness measures associated with respective image frames corresponding to the one or more image frame portions;
  stitching the one image frame portion to the intermediate panoramic image, wherein the current state of the intermediate panoramic image is updated upon stitching of the one image frame portion to the intermediate panoramic image; and
  repeating the operations of determining, storing, identifying and stitching for remaining image frames from among the subset of image frames.

In one embodiment of the method, alternatively or in addition, the extent of overlap is determined to be satisfying the predefined overlap criterion if the extent of overlap is greater than or equal to a predetermined minimum extent of overlap and less than or equal to a predetermined maximum extent of overlap.

In one embodiment the method comprises, alternatively or in addition, discarding the one image frame portion and image frame portions stored in the buffer prior to the storage of the one image frame portion, upon stitching of the one image frame to the intermediate panoramic image.

In one embodiment of the method, alternatively or in addition, the buffer comprises a plurality of buffer portions, each buffer portion from among the plurality of buffer portions associated with a respective overlap limit, the each buffer portion configured to store at least one image frame portion based on the respective overlap limit.

In one embodiment of the method, alternatively or in addition, the each buffer portion is configured to retain only one image frame portion from among at least one image frame portion based on the sharpness measures associated with respective image frames corresponding to at least one image frame portion.

In one embodiment the method comprises, alternatively or in addition, displaying, by the processor, the panoramic image on a display associated with an electronic device subsequent to configuring the panoramic image.

In one embodiment of the method, alternatively or in addition, at least half a portion of the first image frame is extracted from the first image frame to configure the intermediate panoramic image.

In one embodiment of the method, alternatively or in addition, at least half a portion of the last image frame is stitched to the augmented intermediate panoramic image to configure the panoramic image.

An aspect of an apparatus for generating a panoramic image from a set of consecutive image frames comprises:
  at least one processor; and
  at least one memory comprising a buffer, the at least one memory comprising computer program code, the at least one memory and the computer program code configured to, with the at least one processor, cause the apparatus to at least perform:
    receive the set of consecutive image frames;
    extract a portion of a first image frame from among the set of consecutive image frames to configure an intermediate panoramic image;
    augment the intermediate panoramic image by stitching image frame portions to the intermediate panoramic image, each image frame portion selected from a respective individual image frame in a subset of image frames comprising consecutive image frames from a second image frame to a penultimate image frame from among the set of consecutive image frames, the each image frame portion selected based on a sharpness measure and an overlap measure associated with the respective individual image frame, the overlap measure determined based on a comparison of the respective individual image frame with a current state of the intermediate panoramic image; and stitch a portion of a last image frame from among the set of consecutive image frames to the augmented intermediate panoramic image to configure the panoramic image.

In one embodiment of the apparatus, for stitching the image frame portions to the intermediate panoramic image comprises, the apparatus is further caused, at least in part to sequentially perform for the consecutive image frames in the subset of image frames:

determine an extent of overlap between an image frame in the subset of image frames and the current state of the intermediate panoramic image, wherein the determined extent of overlap serves as the overlap measure for the image frame;

store at least a part of the image frame as an image frame portion in the buffer if the extent of overlap satisfies a predefined overlap criterion, wherein one or more image frame portions from image frames satisfying the predefined overlap criterion are stored in the buffer until a subsequent image frame not satisfying the predefined overlap criterion is encountered;

identify one image frame portion associated with a highest sharpness measure from among the one or more image frame portions stored in the buffer based on sharpness measures associated with respective image frames corresponding to the one or more image frames;

stitch the one image frame portion to the intermediate panoramic image, wherein the current state of the intermediate panoramic image is updated upon stitching of the one image frame portion to the intermediate panoramic image; and repeat the operations of determining, storing, identifying and stitching for remaining image frames from among the subset of image frames.

In one embodiment of the apparatus, alternatively or in addition, the extent of overlap is determined to be satisfying the predefined overlap criterion if the extent of overlap is greater than or equal to a predetermined minimum extent of overlap and less than or equal to a predetermined maximum extent of overlap.

In one embodiment of the apparatus, alternatively or in addition, the apparatus is further caused, at least in part to:
discard the one image frame portion and image frame portions stored in the buffer prior to the storage of the one image frame portion upon stitching of the one image frame portion to the intermediate panoramic image.

In one embodiment of the apparatus, alternatively or in addition, the buffer comprises a plurality of buffer portions, each buffer portion from among the plurality of buffer portions associated with a respective overlap limit, the each buffer portion configured to store at least one image frame portion based on the respective overlap limit.

In one embodiment of the apparatus, alternatively or in addition, the each buffer portion is configured to retain only one image frame portion from among at least one image frame portion based on the sharpness measures associated with respective image frames corresponding to at least one image frame portion.

In one embodiment of the apparatus, alternatively or in addition, the apparatus is further caused, at least in part to:
display the panoramic image on a display associated with an electronic device subsequent to configuring the panoramic image, wherein the electronic device is one of a mobile phone, a smartphone, a tablet computer and a camera device.

A second aspect of an apparatus for generating a panoramic image from a set of consecutive image frames comprises:

at least one processor; and at least one memory comprising a buffer, the at least one memory comprising computer program code, the at least one memory and the computer program code configured to, with the at least one processor, cause the apparatus to at least perform:

receive the set of consecutive image frames;

extract a portion of a first image frame from among the set of consecutive image frames to configure an intermediate panoramic image;

augment the intermediate panoramic image by stitching image frame portions to the intermediate panoramic image, each image frame portion selected from a respective individual image frame in a subset of image frames comprising consecutive image frames from a second image frame to a penultimate image frame from among the set of consecutive image frames, the image frame portions selected by sequentially performing for the consecutive image frames in the subset of image frames:

determining an extent of disparity between an image frame in the subset of image frames and a current state of the intermediate panoramic image;

storing at least a part of the image frame as an image frame portion in the buffer if the extent of disparity satisfies a predefined disparity criterion, wherein one or more image frame portions from image frames satisfying the predefined disparity criterion are stored in the buffer until a subsequent image frame not satisfying the predefined disparity criterion is encountered;

identifying one image frame portion associated with a highest sharpness measure from among the one or more image frame portions stored in the buffer based on sharpness measures associated with respective image frames corresponding to the one or more image frame portions;

stitching the one image frame portion to the intermediate panoramic image, wherein the current state of the intermediate panoramic image is updated upon stitching of the one image frame portion to the intermediate panoramic image; and repeating the operations of determining, storing, identifying and stitching for remaining image frames from among the subset of image frames; and stitch a portion of a last image frame from among the set of consecutive image frames to the augmented intermediate panoramic image to configure the panoramic image.

In one embodiment of the second aspect of the apparatus, the extent of disparity is determined to be satisfying the predefined disparity criterion if the extent of disparity is less than or equal to a predetermined maximum extent of disparity and greater than or equal to a predetermined minimum extent of disparity.

In one embodiment of the second aspect of the apparatus, alternatively or in addition, the buffer comprises a plurality of buffer portions, each buffer portion from among the plurality of buffer portions associated with a respective disparity limit, the each buffer portion configured to store at least one image frame portion based on the respective disparity limit.

In one embodiment of the second aspect of the apparatus, alternatively or in addition, the apparatus is further caused, at least in part to:

discard the one image frame portion and image frame portions stored in the buffer prior to the storage of the one image frame portion, upon stitching of the one image frame portion to the intermediate panoramic image.

Various example embodiments offer, among other benefits, techniques for providing a pleasant and comfortable viewing experience to a viewer of the captured image content. The various embodiments disclosed herein suggest generating panoramic images by stitching sharp image frame portions selected from captured consecutive image frames. Selecting sharp image frame portions for generating panoramic images, as opposed to selecting image frame portions with an appropriate amount of overlap, avoids selecting image frame portions with blur, thereby improving a quality of generated panoramic images. A viewer of such generated panoramic images may be able to view the panoramic images without any lens or handshake induced or even motion induced distortion, thereby providing the viewer with a pleasant and comfortable viewing experience.

It is noted that various example embodiments as described herein may be implemented in a wide variety of devices, network configurations and applications for example, in camera devices, in mobile devices or as part of software imaging applications used in any electronic devices.

Computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the operations of any of the methods described herein when the program is run on a computer and where the computer program may be embodied on a computer readable medium. Examples of tangible storage media include computer storage devices such as disks, thumb drives, memory etc. The software can be suitable for execution on a parallel processor or a serial processor such that the method operations may be carried out in any suitable order, or simultaneously.

Alternatively, or in addition, the functionality described herein (such as the image processing instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

The embodiments illustrated and described herein as well as embodiments not specifically described herein but within the scope of aspects of the invention constitute exemplary apparatus means for generating a panoramic image from a set of consecutive image frames. For example, the elements illustrated and described with reference to FIGS. 1 and 8, when configured, under control of the processor 102 and program code in the memory 104 to perform the operations illustrated and described with reference to FIGS. 3, 4, 7, 7A and 7B, constitute an exemplary image processing application means for receiving a set of consecutive image frames, for extracting a portion of a first image frame from among the set of consecutive image frames to configure an intermediate panoramic image, for augmenting the intermediate panoramic image by stitching image frame portions to the intermediate panoramic image, each image frame portion selected from a respective individual image frame in a subset of image frames comprising consecutive image frames from a second image frame to a penultimate image frame from among the set of consecutive image frames, the each image frame portion selected based on a sharpness measure and an overlap measure associated with the respective individual image frame, the overlap measure determined based on a comparison of the respective individual image frame with a current state of the intermediate panoramic image, and for stitching a portion of a last image frame from among the set of consecutive image frames to the augmented intermediate panoramic image to configure the panoramic image.

The benefits and advantages described above may relate to one embodiment or may relate to several embodiments. The embodiments are not limited to those that solve any or all of the stated problems or those that have any or all of the stated benefits and advantages.

The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method for generating a panoramic image from a set of consecutive image frames, the method comprising:
receiving the set of consecutive image frames;
extracting, by a processor, a portion of a first image frame from among the set of consecutive image frames to configure an intermediate panoramic image;
augmenting, by the processor, the intermediate panoramic image by stitching image frame portions to the intermediate panoramic image, each image frame portion selected from a respective individual image frame in a subset of image frames comprising consecutive image frames from a second image frame to a penultimate image frame from among the set of consecutive image frames, the each image frame portion selected based on a sharpness measure and an overlap measure associated with the respective individual image frame, the overlap measure defined by an overlap criterion related to an amount of overlap and determined based on a comparison of the respective individual image frame with a current state of the intermediate panoramic image, wherein image frame portions having a varying amount of overlap that satisfy the overlap criterion are stored until the amount of overlap for one of the image frame portions is outside of a range of the overlap criterion, then selecting an image frame portion for stitching to the intermediate panoramic image based on the sharpness measure and discarding the image frame portions stored prior to storage of the selected image frame portion, and continuing with the comparison until a last image frame is reached; and
stitching, by the processor, a portion of the last image frame from among the set of consecutive image frames to the augmented intermediate panoramic image to configure the panoramic image.

2. The method of claim 1, wherein stitching the image frame portions to the intermediate panoramic image comprises sequentially performing for the consecutive image frames in the subset of image frames:
determining an extent of overlap between an image frame in the subset of image frames and the current state of the intermediate panoramic image, wherein the determined extent of overlap serves as the overlap measure for the image frame;
storing at least a part of the image frame as an image frame portion in a buffer if the extent of overlap satisfies the overlap criterion, wherein one or more image frame portions from image frames satisfying the overlap criterion are stored in the buffer until a subsequent image frame not satisfying the overlap criterion is encountered;
identifying one image frame portion associated with a highest sharpness measure from among the one or more image frame portions stored in the buffer based on sharpness measures associated with respective image frames corresponding to the one or more image frame portions;
stitching the one image frame portion to the intermediate panoramic image, wherein the current state of the intermediate panoramic image is updated upon stitching of the one image frame portion to the intermediate panoramic image; and
repeating the operations of determining, storing, identifying and stitching for remaining image frames from among the subset of image frames.

3. The method of claim 2, wherein the extent of overlap is determined to be satisfying the overlap criterion if the extent of overlap is greater than or equal to a defined minimum extent of overlap and less than or equal to a defined maximum extent of overlap.

4. The method of claim 2, further comprising:
discarding the one image frame portion and image frame portions stored in the buffer prior to the storage of the one image frame portion, upon stitching of the one image frame to the intermediate panoramic image.

5. The method of claim 2, wherein the buffer comprises a plurality of buffer portions, each buffer portion from among the plurality of buffer portions associated with a respective overlap limit, the each buffer portion configured to store at least one image frame portion based on the respective overlap limit.

6. The method of claim 5, wherein the each buffer portion is configured to retain only one image frame portion from among at least one image frame portion based on the sharpness measures associated with respective image frames corresponding to at least one image frame portion.

7. The method of claim 1, further comprising:
displaying, by the processor, the panoramic image on a display associated with an electronic device subsequent to configuring the panoramic image.

8. The method of claim 1, wherein at least half a portion of the first image frame is extracted from the first image frame to configure the intermediate panoramic image.

9. The method of claim 1, wherein at least half a portion of the last image frame is stitched to the augmented intermediate panoramic image to configure the panoramic image.

10. An apparatus for generating a panoramic image from a set of consecutive image frames, comprising:
at least one processor; and
at least one memory comprising a buffer, the at least one memory comprising computer program code, the at least one memory and the computer program code configured to, with the at least one processor, cause the apparatus to at least perform:
receive the set of consecutive image frames;
extract a portion of a first image frame from among the set of consecutive image frames to configure an intermediate panoramic image;
augment the intermediate panoramic image by stitching image frame portions to the intermediate panoramic image, each image frame portion selected from a respective individual image frame in a subset of image frames comprising consecutive image frames from a second image frame to a penultimate image frame from among the set of consecutive image frames, the each image frame portion selected based on a sharpness measure and an overlap measure associated with the respective individual image frame, the overlap measure defined by an overlap criterion related to an amount of overlap and determined based on a comparison of the respective individual image frame with a current state of the intermediate panoramic image, wherein image frame portions having a varying amount of overlap that satisfy the overlap criterion are stored until the amount of overlap for one of the image frame portions is outside of a range of the overlap criterion, then selecting an image frame portion for stitching to the intermediate panoramic image based on the sharpness measure and discarding the image frame portions stored prior to storage of the selected image frame portion, and continuing with the comparison until a last image frame is reached; and stitch a portion of the last image frame from among the set of consecutive image frames to the augmented intermediate panoramic image to configure the panoramic image.

11. The apparatus of claim 10, wherein for stitching the image frame portions to the intermediate panoramic image comprises, the apparatus is further caused, at least in part to sequentially perform for the consecutive image frames in the subset of image frames:
   determine an extent of overlap between an image frame in the subset of image frames and the current state of the intermediate panoramic image, wherein the determined extent of overlap serves as the overlap measure for the image frame;
   store at least a part of the image frame as an image frame portion in the buffer if the extent of overlap satisfies the overlap criterion, wherein one or more image frame portions from image frames satisfying the overlap criterion are stored in the buffer until a subsequent image frame not satisfying the overlap criterion is encountered;
   identify one image frame portion associated with a highest sharpness measure from among the one or more image frame portions stored in the buffer based on sharpness measures associated with respective image frames corresponding to the one or more image frames;
   stitch the one image frame portion to the intermediate panoramic image, wherein the current state of the intermediate panoramic image is updated upon stitching of the one image frame portion to the intermediate panoramic image; and
   repeat the operations of determining, storing, identifying and stitching for remaining image frames from among the subset of image frames.

12. The apparatus of claim 11, wherein the extent of overlap is determined to be satisfying the overlap criterion if the extent of overlap is greater than or equal to a defined minimum extent of overlap and less than or equal to a defined maximum extent of overlap.

13. The apparatus of claim 11, wherein the apparatus is further caused, at least in part to:
   discard the one image frame portion and image frame portions stored in the buffer prior to the storage of the one image frame portion upon stitching of the one image frame portion to the intermediate panoramic image.

14. The apparatus of claim 11, wherein the buffer comprises a plurality of buffer portions, each buffer portion from among the plurality of buffer portions associated with a respective overlap limit, the each buffer portion configured to store at least one image frame portion based on the respective overlap limit.

15. The apparatus of claim 14, wherein the each buffer portion is configured to retain only one image frame portion from among at least one image frame portion based on the sharpness measures associated with respective image frames corresponding to at least one image frame portion.

16. The apparatus of claim 10, wherein the apparatus is further caused, at least in part to:
   display the panoramic image on a display associated with an electronic device subsequent to configuring the panoramic image, wherein the electronic device is one of a mobile phone, a smartphone, a tablet computer and a camera device.

17. An apparatus for generating a panoramic image from a set of consecutive image frames, comprising:
   at least one processor; and
   at least one memory comprising a buffer, the at least one memory comprising computer program code, the at least one memory and the computer program code configured to, with the at least one processor, cause the apparatus to at least perform:
   receive the set of consecutive image frames;
   extract a portion of a first image frame from among the set of consecutive image frames to configure an intermediate panoramic image;
   augment the intermediate panoramic image by stitching image frame portions to the intermediate panoramic image, each image frame portion selected from a respective individual image frame in a subset of image frames comprising consecutive image frames from a second image frame to a penultimate image frame from among the set of consecutive image frames, the image frame portions selected by sequentially performing for the consecutive image frames in the subset of image frames:
      determining an extent of disparity between an image frame in the subset of image frames and a current state of the intermediate panoramic image;
      storing at least a part of the image frame as an image frame portion in the buffer if the extent of disparity satisfies a predefined disparity criterion, wherein one or more image frame portions from image frames satisfying the predefined disparity criterion are stored in the buffer until a subsequent image frame not satisfying the predefined disparity criterion is encountered;
      identifying one image frame portion associated with a highest sharpness measure from among the one or more image frame portions stored in the buffer based on sharpness measures associated with respective image frames corresponding to the one or more image frame portions;
      stitching the one image frame portion to the intermediate panoramic image, wherein the current state of the intermediate panoramic image is updated upon stitching of the one image frame portion to the intermediate panoramic image; and
      repeating the operations of determining, storing, identifying and stitching for remaining image frames from among the subset of image frames; and
   stitch a portion of a last image frame from among the set of consecutive image frames to the augmented intermediate panoramic image to configure the panoramic image.

18. The apparatus of claim 17, wherein the extent of disparity is determined to be satisfying the predefined disparity criterion if the extent of disparity is less than or equal to a predetermined maximum extent of disparity and greater than or equal to a predetermined minimum extent of disparity.

19. The apparatus of claim 17, wherein the buffer comprises a plurality of buffer portions, each buffer portion from among the plurality of buffer portions associated with a respective disparity limit, the each buffer portion configured to store at least one image frame portion based on the respective disparity limit.

20. The apparatus of claim 17, wherein the apparatus is further caused, at least in part to:
   discard the one image frame portion and image frame portions stored in the buffer prior to the storage of the one image frame portion, upon stitching of the one image frame portion to the intermediate panoramic image.

\* \* \* \* \*